Feb. 13, 1962    O. DE MURREL CRUMP    3,021,180
OVERLOAD BREAKER

Filed April 18, 1960    2 Sheets-Sheet 2

INVENTOR.
Owen DeMurrel Crump.
BY Fishburn & Gold
ATTORNEYS.

United States Patent Office 3,021,180
Patented Feb. 13, 1962

3,021,180
OVERLOAD BREAKER
Owen De Murrel Crump, 501–11 S. Kansas Ave.,
Olathe, Kans.
Filed Apr. 18, 1960, Ser. No. 22,976
2 Claims. (Cl. 302—56)

This invention relates to an overload breaker for ensilage loaders, and more particularly to apparatus for breaking up the ensilage as it is fed to the blower of the loader by an auger or the like.

The present invention is an improvement over the apparatus disclosed in my application filed January 5, 1959, Serial No. 784,954, now Patent No. 2,941,843.

It has been found that with the ensilage loader as described in my above noted application when the digger element moves the ensilage into the apron of the pan in which the auger is housed, oftentimes the auger and fins thereon will move the ensilage upwardly and rearwardly of the loader toward the blower fan in large chunks or wads and thus clog the opening to the blower fan.

It is the principal object of the present invention to provide a breaker element mounted in the frame of the auger housing above and adjacent the auger and rotatable in the same direction and simultaneously with the auger whereby the auger and breaker element cooperate to break up any chunks or large particles of the ensilage so that it will be fed through the blower opening in comminuted condition.

Other objects of the present invention are to provide means for driving and rotating the breaker element simultaneously with rotation of the auger element; to provide the breaker element with a plurality of blades or arms for engaging the ensilage which moves over the fins of the auger to break the same into finer particles as it moves towards the blower openings and to provide a device of this character simple and economical to manufacture.

In accomplishing these and other objects of the invention, I have provided improved details of structure, the preferred forms of which are shown in the accompanying drawings wherein.

Figure 1:
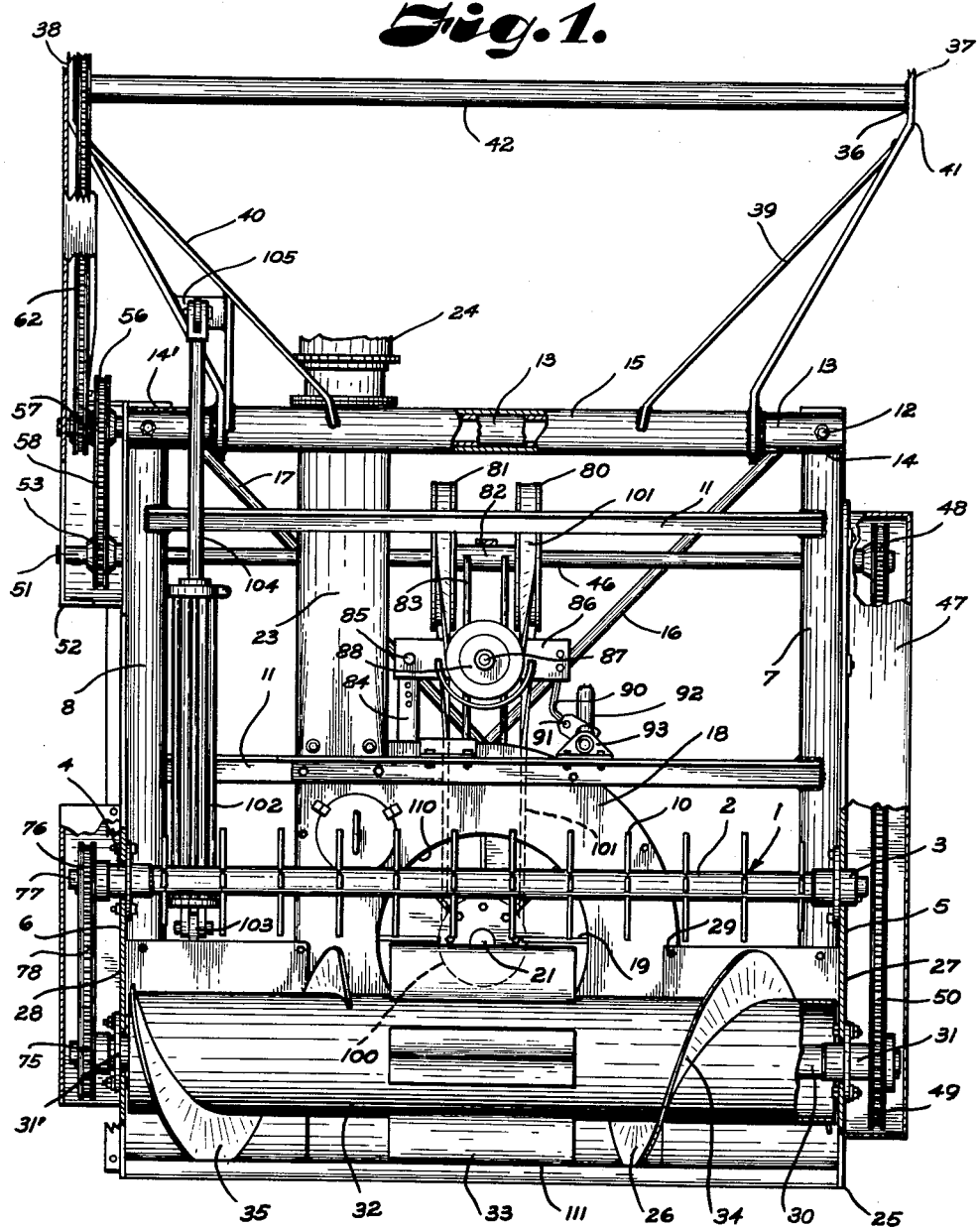
FIG. 1 is a partially cross-sectional front view particularly illustrating the auger and the overload breaker mounted thereabove.

Referring more in detail to the drawings:

1 designates a breaker element embodying the features of my invention which includes a shaft 2 mounted in bearings 3 and 4 secured to side frames 5 and 6 which are secured to uprights 7 and 8 carried by a frame 9 (FIG. 2) for mounting of the structure on a tractor or the like (not shown) but illustrated and described in my co-pending application Serial No. 784,954 now Patent No. 2,941,843.

The breaker element 1 includes a plurality of rows of blades or arms 10 extending radially outwardly on the shaft 2 and secured thereto by welding or other suitable means. I have here illustrated four rows of the arms or blades secured circumferentially around the shaft 2 in spaced relation but I do not wish to be limited to this particular structure as the arms may be placed on the shaft otherwise than disclosed, the purpose being to break up the ensilage as later described.

Uprights 7 and 8 are secured on the frame as illustrated in my co-pending application and mounted between the upper and lower ends are spaced cross bars 11 for lending rigidity to the structure. Mounted to the upper ends of the uprights or posts 7 and 8 by bolts or the like 12 is a tubular cross member 13 secured in short half-circular sleeves 14 and 14'. Sleeved over the tubular member 13 between the half-circular sleeves 14 and 14' is a tubular sleeve 15 rotatable on the tube 13 as will later be referred to. Cross braces 16 and 17 have their upper ends secured to the half-sleeves 14 and 14' and their lower ends secured to the frame 9 to further stabilize the structure.

Figure 2:
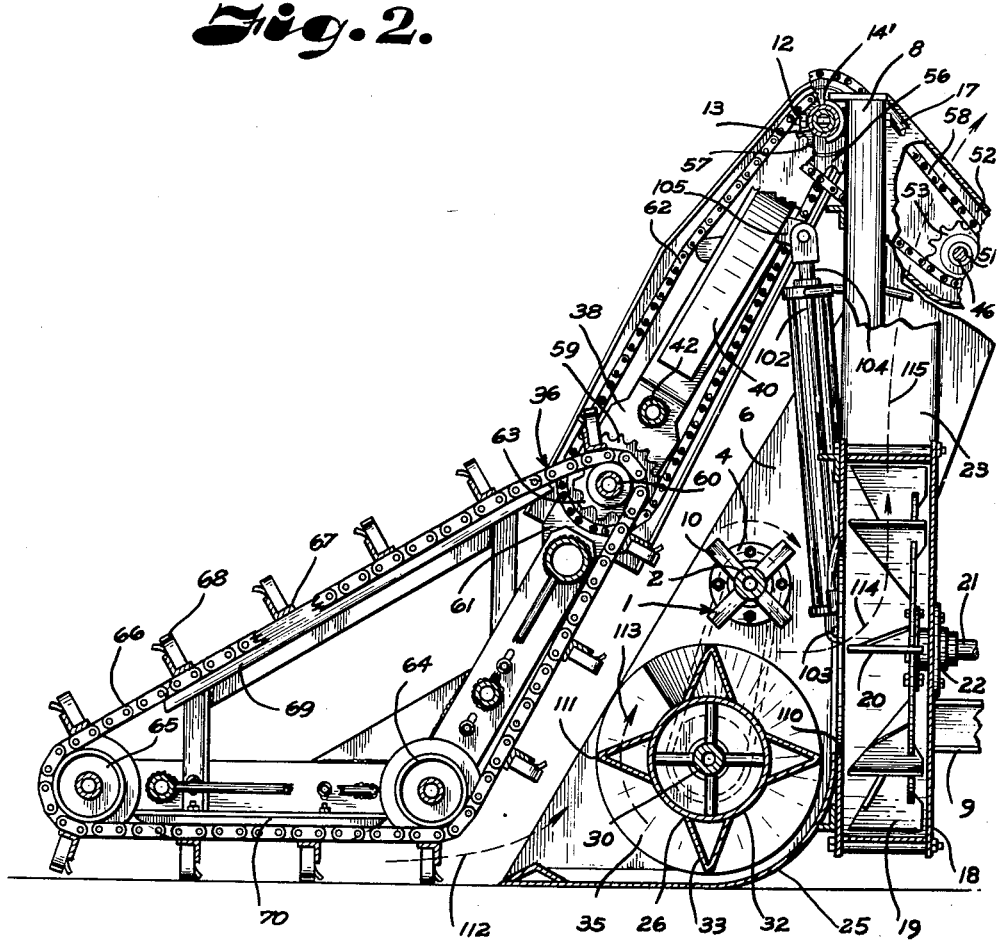
FIG. 2 is a cross-sectional view particularly illustrating the digger element and the auger and breaker element in cross section to better illustrate the invention.

Mounted on the frame 9 between the uprights 7 and 8 is a blower housing 18 for a fan 19 having the usual blades 20. The fan is mounted on the drive shaft 21 carried by the frame structure 9 and having a bearing 22 secured to the housing 18 as best illustrated in FIG. 2, and extending into the housing to mount the fan thereon. Connected to one side at the top of the blower housing is a blower chute 23 and rotatably attached to the upper end thereof is an extension chute 24 leading to a spout (not shown) but illustrated in my co-pending application for disposing of the ensilage as therein described.

25 designates a pan or apron for an auger 26 mounted on side plates 27 and 28 of the side frames 5 and 6. The auger pan is bolted to the blower housing by a plurality of bolts as indicated at 29. The auger 26 is mounted on a shaft 30 supported by inbearings 31 and 31' in the side plates 27 and 28 and the shaft extends outwardly from said plates. Mounted on the shaft is a circular housing 32 and mounted at substantially the center thereof and extending radially outwardly therefrom are a plurality of blades 33. Spirals 34 and 35 are provided on the auger and are so arranged that the ensilage will be pushed or guided to the center thereof into the path of the blades 33.

A digger assembly 36 is attached to the tubular member 15 by a boom arrangement comprising arms 37 and 38 spaced on the boom 15 and having braces 39 and secured thereto by welding or the like. The outer ends of the arms are turned to parallel relation as indicated at 41 and are connected by a cross member 42.

Spaced inwardly from the ends of the arms 37 and 38 are substantially V-shaped arms 45 with their outer ends extending horizontally when in the ground engaging position as best illustrated in FIG. 2.

Mounted in the upper end of the side plates 27 and 28 of the side frames 5 and 6 is a jackshaft 46 extending behind the uprights 7 and 8 and on one end of the shaft 46 extends into a housing 47 mounted on the plate 27. The jackshaft extends outwardly from said side plates and mounted thereon is a sprocket 48 aligning with a sprocket 49 on the auger shaft 30 for a chain 50 for operating the auger as will later be described. The other end 51 of the shaft 46 extends into the housing 52 and on said shaft is a sprocket 53. Mounted in the end 54 of the tube 13 is a short shaft 55 upon which are rotatably mounted sprockets 56 and 57. The sprocket 56 aligning with the sprocket 53 for receiving a chain 58. A sprocket 59 is mounted upon a shaft 60 rotatably mounted between the forward ends 61 of the arms 37 and 38, said sprocket having driving connection through a chain 62 with the sprocket 57 as illustrated in FIG. 2. The boom and digger element are fully described and illustrated in my co-pending application and is here illustrated only generally and includes sprockets 63 mounted on either side of the shaft 60 in alignment with pulleys 64 and 65, 64 being mounted in the V of the digger assembly 36 and the pulleys being mounted at the outer or forward end of said assembly pulleys 65 and chains 66 having spaced slats or lugs 67 mounted thereon with digging hooks or elements 68 secured to said lugs. The chain runs over trackways 69 and 70 also as illustrated in my co-pending application.

Mounted on the end of the auger shaft 30 opposite the sprocket 49 is a sprocket 75 aligning with a sprocket 76 mounted on the end 77 of the shaft 2 of the breaker element for accommodating a chain 78 and to provide a driving connection between auger shaft 30 and breaker shaft 2. A housing 79 is provided for the chain 78 and sprockets 75 and 76 respectively mounted on the side plate 28 of the side frame 6.

Mounted on the jackshaft 46 and at substantially the center thereof are spaced pulleys 80 and 81 and mounted therebetween is a shaft support or bearing 82 having braces 83 secured thereto which extend upwardly from the top of the blower housing 18. An upright bracket 84 is similarly secured to the top of the blower housing near the braces 83 and pivotally connected to said bracket as at 85 is one end of an arm 86 carrying a short shaft 87 extending longitudinally of the frame and transversely to the direction of the jackshaft 46. Mounted on the shaft 87 is a clutch pulley 88. The other end 89 of the arm 86 is loosely connected to a rod or link 90 having a loose connection as at 91 with an operating rod 92 with one end thereof rotatable in a bracket 93 also as illustrated in my co-pending application.

Mounted on the shaft 21 as shown in dotted lines is a pulley 100 over which is run an endless belt 101 which has its opposite runs engaging over the pulleys 80 and 81 and around the clutch pulley 88 whereby the belt may be loosened or tightened by operation of the rod 92 to control operation of the jackshaft 46 also as illustrated in my co-pending application.

A hydraulic power unit (not shown is mounted on the main frame and includes a hydraulic cylinder 102 having its lower end pivotally mounted to the frame as indicated at 103 and the piston rods 104 are pivotally secured to a bracket 105 extending between the arm 38 and brace 40 (FIG. 1) for raising and lowering the digger assembly 36.

The ensilage loader as described preferably is mounted on wheels (not shown) secured to the frame 9; and to raise or lower the loader with respect to ground I have provided a bracket or lever arrangement by swingably mounting of the wheels on brackets which are pivotally connected to the frame 9 as disclosed in my application filed January 5, 1959, Serial No. 784,954, now Patent No. 2,941,843.

The loader may also be mounted directly to a tractor by a device commonly known as a three-point hitch, operated by the hydraulic system of the tractor or the system operating the digger assembly.

Operation of a structure assembled as described is as follows:

The shaft 21 is operated by the power takeoff of a tractor (not shown) but as illusrtated in my co-pending application which operates the blower 19 and pulley 100 for operation of pulley 88 and pulleys 80 and 81. The pulley 88 operating as a clutch for rotation of the jackshaft 46 for rotation of the sprockets 48 and 49 through chain 50 to rotate the auger 26 in a clockwise direction looking from the right side which at the same time will rotate the shaft 2 of the ensilage breaker element 1 in the same clockwise direction through sprockets 75 and 76 and chain 78 on the other side of the structure.

When the loader is backed into the ensilage bin (not shown) and the frame of the tractor lowered to the ground, the apron 25 will rest on the ground. Operation of the shaft 21 and the jackshaft 46 also operate the shaft 60 of the digger assembly through sprockets 53 and 56 by chain 58 and through sprockets 57 and 59 by chain 62 on the boom assembly to rotate the sprocket 63 of the digging element to cause the chain 66 to move in an anticlockwise direction to dig into the ensilage and pull the same into the apron 25 where the blades 33 will pick it up and move it towards the blower where it will fall downwardly and be drawn ino the blower housing by the fan 19. Should any lumps or chunks occur in the ensilage which would tend to close the opening to the blower as the ensilage rolls over the housing 32, the blades or arms 10 of the breaker element 1 will contact and trap the same between the arms 10 and the auger and induce violent motion thereto to break up the lumps and chunks so that they will be disintegrated and moved into the opening 110 of the blower housing with ease. It will be noted the blades or arms 10 are very close to the edge 111 of the blades 33 on the housing 32 of the auger.

By reference to FIG. 2 the path of travel of the ensilage follows the arrows as indicated at 112, 113, 114 and 115. The breaker element 1 urges the ensilage against the path of travel indicated at 113 and 114 whereby the auger 26 cooperates with the breaker element 1 to disintegrate the ensilage as described.

It will be obvious from the foregoing that I have provided improved details for breaking up ensilage in a loading device as for the purpose set forth.

What I claim and desire to secure by Letters Patent is:

1. In an apparatus for picking up ensilage from a pile and depositing same in a truck; a frame, a pan supported by said frame and having an auger therein adapted to move ensilage in a path of travel from said pan, a blower housing containing a fan and having an intake opening in said path of travel and adjacent said auger for receiving the ensilage moved thereby, said blower housing communicating with a delivery chute for transporting and depositing the ensilage impelled by said fan, means mounting said auger on said frame for rotation on an axis extending transversely of said path of travel, an ensilage breaking element, means rotatably mounting said breaking element on said frame adjacent said auger and in said path of travel between said pan and said intake opening, said ensilage breaking element rotating on an axis extending parallel to the auger axis and said breaking element including a plurality of rows of radially extending spaced blades extending over substantially the length of said auger, a digger element mounted on said frame forwardly of said pan and adapted to move ensilage rearwardly of said apparatus and into said pan, means for driving said auger and digger element simultaneously, and means for rotatably driving said breaking element in a direction urging ensilage against said path of travel whereby said auger and breaknig element cooperate to disintegrate large chunks of ensilage to facilitate the entry of same into said intake opening.

2. In an apparatus for picking up ensilage from a pile and depositing same in a truck; a frame, a pan supported by said frame and having an auger therein with a spiral on a portion thereof and adapted to move ensilage in a path of travel from said pan, said auger having longitudinal fins on another portion of the length thereof, said fins extending substantially radially of the auger axis, a blower housing containing a fan and having an intake opening in said path of travel and adjacent said fins on said auger for receiving the ensilage moved thereby, said blower housing communicating with a delivery chute for transporting and depositing the ensilage impelled by said fan, means mounting said auger on said frame for rotation on an axis extending transversely of said path of travel, an ensilage breaking element, means rotatably mounting said breaking element on said frame adjacent said auger and in said path of travel between said pan and said intake opening, said ensilage breaking element rotating on an axis extending parallel to the auger axis and said breaking element including a plurality of rows of generally radially extending spaced blades with said rows extending for a length greater than the length of said fins on the auger, a digger element mounted on said frame forwardly of said pan and adapted to move ensilage rearwardly of said apparatus and into said pan, means for driving said auger and digger element simultaneously, and means for rotatably driving said breaking element in a direction urging ensilage against said path of travel whereby said auger and breaking element cooperate to disintegrate large chunks of ensilage to facilitate the entry of same into said intake opening.

References Cited in the file of this patent

UNITED STATES PATENTS

| | | |
|---|---|---|
| 2,464,973 | Freiden | Mar. 22, 1949 |
| 2,553,484 | Stauch | May 15, 1951 |
| 2,739,846 | Jacobsen | Mar. 27, 1956 |
| 2,864,655 | Caron | Dec. 16, 1958 |
| 2,877,057 | Buman | Mar. 19, 1959 |
| 2,941,843 | Crump | June 21, 1960 |